(12) United States Patent
Wheatley et al.

(10) Patent No.: US 12,510,466 B2
(45) Date of Patent: Dec. 30, 2025

(54) MEASUREMENT SYSTEM INCLUDING REFLECTOR

(71) Applicant: 3M INNOVATIVE PROPERTIES COMPANY, St. Paul, MN (US)

(72) Inventors: John A. Wheatley, Stillwater, MN (US); William Gray, Woodbury, MN (US); Bharat R. Acharya, Woodbury, MN (US); Aaron M. Marcella, White Bear Lake, MN (US); Stephen M. Kennedy, St. Paul, MN (US); Brett J. Sitter, Marine on St. Croix, MN (US); Michael L. Steiner, New Richmond, MN (US); Mark A. Roehrig, Stillwater, MN (US); Jonah Shaver, St. Paul, MN (US); Jessica E. DeMay, Maplewood, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 169 days.

(21) Appl. No.: 18/245,271

(22) PCT Filed: Sep. 30, 2021

(86) PCT No.: PCT/IB2021/059009
§ 371 (c)(1),
(2) Date: Mar. 14, 2023

(87) PCT Pub. No.: WO2022/070136
PCT Pub. Date: Apr. 7, 2022

(65) Prior Publication Data
US 2023/0393054 A1 Dec. 7, 2023

Related U.S. Application Data

(60) Provisional application No. 63/086,769, filed on Oct. 2, 2020.

(51) Int. Cl.
*G01N 21/25* (2006.01)
*G01N 21/03* (2006.01)

(52) U.S. Cl.
CPC ......... *G01N 21/031* (2013.01); *G01N 21/253* (2013.01); *G01N 2021/0314* (2013.01);
(Continued)

(58) Field of Classification Search
CPC ............... G01N 21/031; G01N 21/253; G01N 2021/0314; G01N 2201/0636; G01N 2201/0683
(Continued)

(56) References Cited

U.S. PATENT DOCUMENTS

2010/0227769 A1\* 9/2010 Schulz ............... G01N 21/7743
436/63
2013/0175457 A1\* 7/2013 Wada ..................... G01N 21/64
250/234
(Continued)

FOREIGN PATENT DOCUMENTS

KR 20040060088 A 7/2004
KR 101504061 B1 3/2015
(Continued)

OTHER PUBLICATIONS

International Search Report for PCT International Application No. PCT/IB2021/059009, mailed on Jan. 5, 2022, 4 pages.

*Primary Examiner* — Isiaka O Akanbi
(74) *Attorney, Agent, or Firm* — Clifton F. Richardson

(57) ABSTRACT

A measurement system is disclosed and includes a light source, a receiver, a measurement subject, and a reflector. The reflector is disposed on an opposite side of the measurement subject than are the light source and the receiver.

15 Claims, 2 Drawing Sheets

(52) U.S. Cl.
CPC ............... *G01N 2201/0636* (2013.01); *G01N 2201/0683* (2013.01)

(58) Field of Classification Search
USPC ....... 356/436, 445, 369, 128, 448, 132, 134, 356/433, 440, 442, 418, 435
See application file for complete search history.

(56) References Cited

U.S. PATENT DOCUMENTS

| | | | |
|---|---|---|---|
| 2013/0306160 A1* | 11/2013 | Chung | G01N 35/1095 137/13 |
| 2013/0330230 A1* | 12/2013 | Uri | G01N 21/553 422/69 |
| 2014/0320862 A1 | 10/2014 | Kim et al. | |
| 2019/0170636 A1* | 6/2019 | Hartrumpf | G01N 21/55 |
| 2019/0285545 A1* | 9/2019 | Nagai | G01N 21/13 |
| 2019/0339431 A1* | 11/2019 | Wheatley | G01J 3/0229 |
| 2019/0360934 A1* | 11/2019 | Nakamura | G01N 21/13 |
| 2020/0271593 A1* | 8/2020 | Noda | G01N 21/553 |
| 2020/0299630 A1* | 9/2020 | Sasaki | C12M 41/26 |
| 2020/0379231 A1* | 12/2020 | Dohi | C12M 23/14 |

FOREIGN PATENT DOCUMENTS

| | | | | |
|---|---|---|---|---|
| KR | 101602068 B1 | 3/2016 | | |
| KR | 20170135141 A | * 12/2017 | ............ | G01N 21/17 |
| WO | 2017209319 A1 | 12/2017 | | |

* cited by examiner

MEASUREMENT SYSTEM INCLUDING REFLECTOR

CROSS REFERENCE TO RELATED APPLICATIONS

This application is a national stage filing under 35 U.S.C. 371 of PCT/IB2021/059009, filed Sep. 30, 2021, which claims the benefit of U.S. Application No. 63/086,769, filed Oct. 2, 2020, the disclosures of which are incorporated by reference in their entirety herein.

BACKGROUND

Diagnostic tests, such as those related to medical diagnostics, can rely on detecting various differences between samples measured in containment vessels. Such tests often require specific equipment typically found in laboratories. Improved measurement tests including a reflector, or a retroreflector, can perform the analysis faster using simpler and more mobile equipment.

SUMMARY

In some aspects, the present disclosure provides a measurement system. The measurement system can include a light source, a receiver, a measurement subject, and a reflector. The reflector can be disposed on an opposite side of the measurement subject than are the light source and the receiver.

In some aspects, a method for analyzing a measurement subject is disclosed. The method can include providing a light source, the measurement subject, a reflector and a receiver, emitting light from the light source towards the measurement subject, the light emitted from the light source defining a property, and recording a first measurement of the property of the light emitted from the light source. The method can also include passing the light through the measurement subject a first time after the light is emitted from the light source, reflecting the light by the reflector after the light has passed through the measurement subject the first time, and passing the light through the measurement subject a second time after the light has been reflected by the reflector. The method can further include receiving the light by the receiver after the light has passed through the measurement subject the second time, the light that has passed through the measurement subject the second time defining the property, recording a second measurement of the property of the light received by the receiver, and comparing the first measurement to the second measurement.

In some aspects, a method for analyzing a measurement subject is disclosed. The method can include providing a light source, the measurement subject, a reflector and a receiver, emitting light from the light source towards the measurement subject, the light emitted from the light source defining a property, and passing the light through the measurement subject a first time after the light is emitted from the light source. The method can also include reflecting the light by the reflector after the light has passed through the measurement subject the first time, passing the light through the measurement subject a second time after the light has been reflected by the reflector, and receiving the light by the receiver after the light has passed through the measurement subject the second time, the light that has passed through the measurement subject the second time defining the property. The method can also include recording a measurement of the property of the light received by the receiver and comparing the measurement to a reference data set.

DETAILED DESCRIPTION

In the following description, reference is made to the accompanying drawings that form a part hereof and in which various embodiments are shown by way of illustration. The drawings are not necessarily to scale. It is to be understood that other embodiments and implementations are contemplated and may be made without departing from the scope or spirit of the present description. The following detailed description, therefore, is not to be taken in a limiting sense.

As will be discussed below, the present disclosure provides a measurement system for analyzing a measurement subject. Through various elements and technologies, the measurement system can be optimized to gather optical data of a measurement subject faster, easier and cheaper than via traditional measurement techniques.

Figure 1:
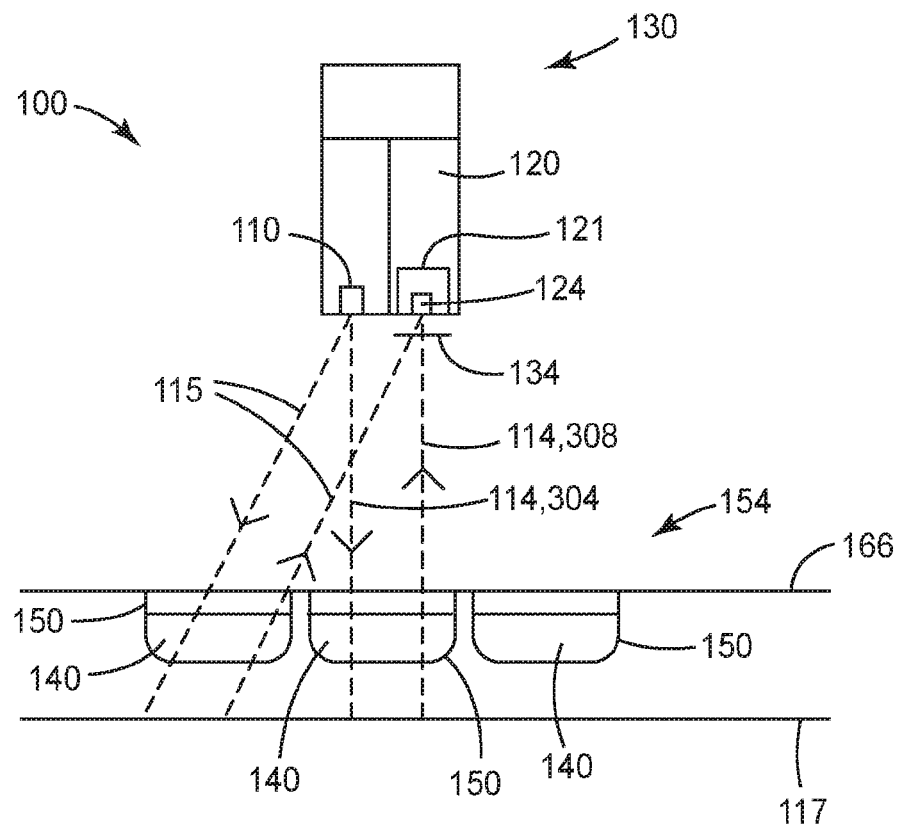
FIG. 1 is a schematic perspective view of a measurement system, including a measurement subject, according to exemplary embodiments of the present disclosure.

FIG. 1 is a schematic perspective view of a measurement system 100, including a measurement subject, according to exemplary embodiments of the present disclosure. The measurement system 100 can include a light source 110, a reflector 117, a receiver 120 and the measurement subject 140. In some implementations, the light source 110 can include one or more of an organic light-emitting diode, a mini light-emitting diode, a micro light-emitting diode, an incandescent filament, a light-emitting diode, a fluorescent element, a laser, a halogen source, or a vertical cavity surface emitting laser. In various embodiments, the light source 110 can emit one or more of ultraviolet light, visible light, infrared light or near-infrared light. In some embodiments, the light source 110 can be narrow band, broad band or multiband. In some embodiments, the light source 110 can be polarized.

At least a portion of light emitted from the light source 110 can travel along an optical path 114. Optical path 114 can travel, as indicated in FIG. 1, from the light source 110, through the measurement subject 140, to the reflector 117, through the measurement subject 140 again after being reflected by the reflector 117, and to the receiver 120. This process, and variations thereon, will be described throughout this specification. The light source 110 can have various angular light distributions, such as a broad or narrow angular distribution. Various angular light spreads emitted from the light source 110 are possible as viewed from the perspective of FIG. 1, centered on a light path 114, 115 and/or centered on an axis perpendicular to the cover 166, and/or the vessel array 154, such as distributions of, substantially of, at most, or at least: 0.01, 0.1, 1, 5, 10, 15, 20, 30, 40, 50, 60, 80, 90, 100, 110, 120, 130, 140, 150, 160 or 170 degrees. In some embodiments, the angular distribution of the light emitted from the light source 110 can be collimated, substantially collimated, have a zero degree, or have a substantially zero degree angular distribution.

In some embodiments, at least a portion of light emitted from the light source 110 can travel along a second optical path 115. Second optical path 115 can travel, as indicated in FIG. 1, from the light source 110, through the measurement subject 140, to the reflector 117, through the measurement subject 140 again after being reflected by the reflector 117 and to the receiver 120. As shown, second optical path 115 can travel through a different portion of the measurement subject 140 than does optical path 114.

In various embodiments, the reflector 117 can reflect all, substantially all, or a portion of light incident on the reflector 117. In some implementations, the reflector 117 can be a specular reflector, a semi-specular reflector, a lambertian reflector, a diffuse reflector or a retroreflector. In the case of the reflector 117 being a retroreflector, the retroreflector 163 can be one of a cube corner reflector, such as 3M Diamond Grade sheeting, or a bead-based retroreflector, such as 3M Scotchlite, or a phase-conjugate retroreflector. In some embodiments, when the reflector 117 is a retroreflector, all, substantially all, or a portion of light incident on the reflector 117 is reflected back along substantially the same path the light traveled (such as the optical path 114, 115) before reaching the reflector 117, but in the opposite direction. In some embodiments, when the reflector 117 is a retroreflector, at least, about or exactly 99%, 95%, 90%, 85%, 80%, 75%, 70%, 65%, 60%, 55%, 50%, 45%, 40%, 35%, 30%, 25%, 20%, 15%, 10%, 5% or 1% of light incident on the reflector 117 is reflected back along substantially the same path the light traveled (such as the optical path 114, 115) before reaching the reflector 117, but in the opposite direction. In some embodiments, when the reflector 117 is a retroreflector, light incident on the reflector 117 from the optical path 114, 115 is reflected such that the receiver 120, sensor 121 and/or pixel 124 (as will be described below) receives at least, about or exactly 99%, 95%, 90%, 85%, 80%, 75% or 70% of the reflected light. In some embodiments, the reflector 117 (which can be a retroreflector) includes a metal. In some embodiments, the reflector 117 (which can be a retroreflector) includes mica.

In various embodiments, the reflector 117 can be flat, or substantially flat. In some embodiments, the reflector can be on a surface of a vessel 150, 150*a*, 150*b*, such as a bottom surface of the vessel 150, 150*a*, 150*b*, which can be a surface farthest from the receiver 120 and/or the light source 110. The reflector 117 can be detuned to add haze and/or decrease the amount of incident light reflected by the reflector 117, which can be accomplished by adding surface structures to the reflector 117, adding an absorber, altering a shape of the reflector 117 and/or altering the materials of the reflector 117. Further, a reflective or retroreflective pattern or material can be added, co-formed with, molded to, injected molded into, coated onto and/or joined to a surface of the vessel 150, 150*a*, 150*b*, such as a bottom surface of the vessel 150, 150*a*, 150*b* which can be a surface farthest from the receiver 120 and/or the light source 110. A retroreflective surface structure can be directly molded (such as via injection molding) into one or more walls of the vessel 150, 150*a*, 150*b*, and optionally can be coated with a reflective material such as a metal.

The receiver 120 can include a sensor 121. The sensor 121 can be, or can include, a complementary metal-oxide-semiconductor (CMOS) sensor, a charge coupled device (CCD) sensor array or a suitable optical sensor or sensor array that is sensitive to light. In some embodiments, the receiver 120 includes a near infrared light camera configured to capture near infrared light. The receiver 120 and/or sensor 121 can sense light over a single area or can be divided into a plurality of light-gathering photosensitive picture elements, or pixels 124. The receiver 120 and/or sensor 121 can be an imaging or non-imaging detector, and in some embodiments can detect the intensity of one or more wavelengths of the light (or a color). In some embodiments, the receiver 120 and/or sensor 121 could be co-extensive with a well plate or vessel array 154, and could include or comprise an organic or TFT sensor array.

The measurement system 100 can include a polarizer 134. The polarizer 134 can be disposed in the optical path 114, 115, and further can be disposed in the optical path 114, 115 between the measurement subject 140 and the receiver 120. In some embodiments, the polarizer 134 is disposed proximate, adjacent and/or in contact with the receiver 120 and/or the device 130. In various embodiments, the polarizer 134 is a linear polarizer, a circular polarizer and/or a polarizer array comprising a plurality of polarizers. In some embodiments, an optical retarder can be disposed in the light path 114, 115. In some embodiments the light source 110 is a polarized source such as a laser or VCSEL (vertical cavity surface emitting laser).

In various embodiments, the light source 110 and the receiver 120 can each be disposed remotely from the measurement subject 140 and from the reflector 117. In some embodiments, the light source 110 and the receiver 120 can each be included in a single device 130. The device 130 can be a mobile device, such as a mobile phone, a laptop computer, a tablet or any other mobile device known to those skilled in the art. In various embodiments, the device 130 can also be a specialized piece of technical optical equipment. Further, in other embodiments, the light source 110 and the receiver 120 can be arranged separately, and not in a single device. The receiver 120 can be the human eye, and in such cases a retroreflective viewer can be used that enables a person to observe the retroreflector 117 and measurement subject 140 at a similar angle to the angle of incidence of the light source emission to the retroreflector 117.

The figures also illustrate a measurement subject 140. The measurement subject 140, which can also be called an analyte, can be any substance being measured by the measurement system 100. In various embodiments, the measurement subject 140 can be a gas, a liquid and/or a solid. In some embodiments, the measurement subject 140 includes more than one material. In some embodiments, the measurement subject 140 includes biological material, such as proteins or antibodies. The measurement subject 140, or portions thereof, can include a non-fluorescing medium, a substantially non-fluorescing medium, a partially non-fluorescing medium, an absorbing medium, a partially absorbing medium and/or a substantially absorbing medium.

The measurement subject 140 can be, wholly or partially, contained in a vessel 150. The vessel 150 can be a well, a microfluidic feature (such as a channel) or any other type of vessel known to those skilled in the art. In some embodiments, the vessel 150 includes an opening, or an un-covered area, at the top of the vessel 150, in a direction facing against the pull of gravity and/or on a side of the vessel 150 facing the receiver 120, light source 110 and/or the device 130. The opening can also be closed, or partially closed, with a cover 166, as can be seen in the figures.

Figure 2:
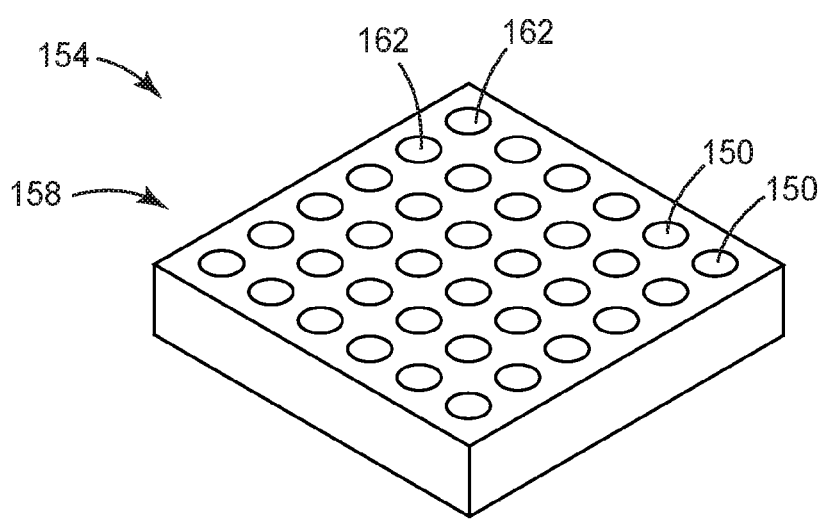
FIG. 2 is a schematic perspective illustration of a vessel array according to exemplary embodiments of the present disclosure.

In some embodiments, the measurement subject 140 can be contained in a plurality of vessels 150. Such a plurality of vessels 150 can be called a vessel array 154, as exemplarily illustrated in FIG. 2. The vessel array 154 can arrange the vessels 150 in any two or three dimensional pattern, and can include any number of vessels 150. In some embodiments, the vessel 150 can be a well, and the vessel array 154 can be a well plate 158, as also illustrated in FIG. 2. As can also be seen, an air space can be formed in a vessel 150, 150a, 150b between the measurement subject 140 and the cover 166, or between the measurement subject 140 and the receiver 120 and/or the light source 110. Vessel 150, 150a, 150b sizing can range from nanometers to centimeters.

Figure 3A:
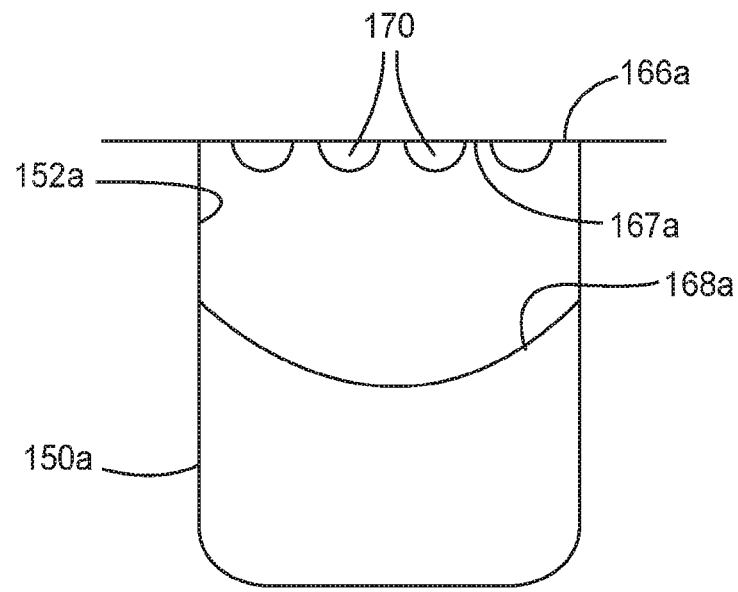
FIG. 3*a* is a schematic illustration of a first vessel according to exemplary embodiments of the present disclosure.
Figure 3B:
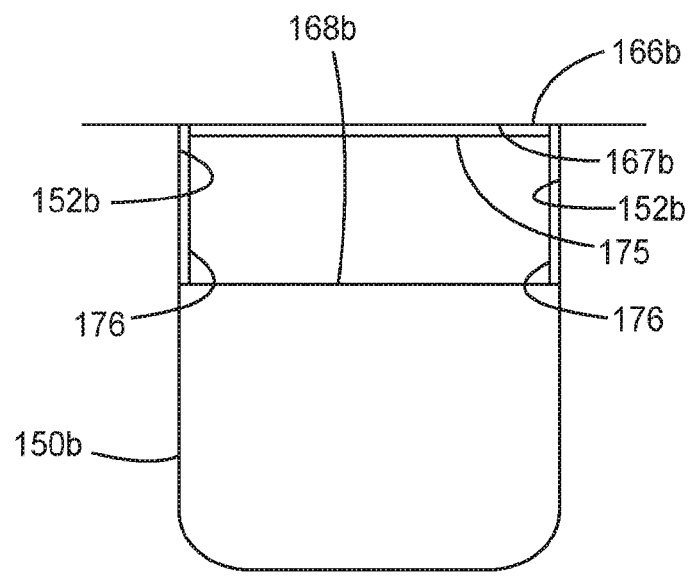
FIG. 3*b* is a schematic illustration of a second vessel according to exemplary embodiments of the present disclosure.

Turning to FIGS. 3 and 4, a first vessel 150a and a second vessel 150b can be seen. Vessels 150a, 150b can be two of the vessels illustrated in FIGS. 1 and 2. Vessel 150a can have a first vessel interior surface 152a and can be covered by a first cover 166a defining a first cover lower surface 167a. Similarly, vessel 150b can have a second vessel interior surface 152b, and can be covered by a second cover 166b defining a second cover lower surface 167b. Portions of measurement subject 140 can be seen in each of the vessels 150a and 150b.

FIG. 3 illustrates droplets 170 formed on the second cover lower surface 167b. Various measurement subjects 140 can produce condensations which can form (as the droplets 170) on the second cover lower surface 167b and/or on the second vessel interior surface 152b. Such droplets 170 can alter the measurements taken by the measurement system 100. Turning to FIG. 4, the second cover lower surface 167b can be coated with a layer 175 which can include a hydrophobic or a hydrophilic material. As the hydrophobic material repels liquids and the hydrophilic material will cause wet out, the droplets 170 are prevented from forming on the second cover lower surface 167b.

Additionally, it can be seen that a first surface measurement subject surface 168a in FIG. 3 is not flat, and in some embodiments can form an irregular or curved surface, which can be termed a meniscus. To prevent such a first surface measurement subject surface 168a from altering measurements taken by the measurement system 100, at least a portion of the second vessel interior surface 152b can be coated with a layer 176 that can include a hydrophobic or a hydrophilic material. As the hydrophobic material repels liquids and the hydrophilic material will cause wet out, surface tension conditions in the first vessel 150a caused by the first vessel interior surface 152a not being coated with a hydrophobic or hydrophilic layer can be avoided and thus a flat (or flatter) second measurement subject surface 168b can be achieved. In some embodiments, any one or more surfaces of the vessel 150, 150a, 150b can be transparent, substantially transparent, opaque, absorbing, substantially absorbing, reflective or substantially reflective.

Additionally, as indicated in FIG. 1, optical path 114 and second optical path 115 can travel through different portions of the measurement subject 140. In some embodiments, optical path 114 could travel through one vessel 150 containing a portion of the measurement subject 140 while optical path 115 could travel through another vessel 150 containing another portion of the measurement subject 140. In some embodiments, optical path 114 could travel through the first vessel 150a containing a portion of the measurement subject 140 while optical path 115 could travel through the second vessel 150b containing a second portion of the measurement subject 140. In other words, vessels 150 as shown in FIGS. 1 and 2 can be any combination of vessels 150, vessels 150a and/or vessels 150b. The retro-reflective properties of the reflector 117 can enable such functionality, by allowing light from common light source 110 to pass through different portions of the measurement subject 140 twice and be reflected by the reflector 117 before reaching a common receiver 120, despite the portions of the measurement subject 140 being at different locations relative to other portions of the measurement system 100. It is also to be understood that different portions of the measurement subject 140, such as those contained in different vessels 150, 150a, 150b, can be different materials, samples, portions or phases while all being considered part of the same measurement subject 140.

A method for analyzing the measurement subject 140 is also disclosed. The method can include providing the light source 110, the measurement subject 140, the reflector 117 and the receiver 120. Light can be emitted from the light source 110 towards the measurement subject 140, the light emitted from the light source can define a property (as will be described below in further detail). The light from the light source 110 can travel along the optical path 114. A first measurement of the property of the light emitted from the light source 110 can be recorded. The method can also include passing the light through the measurement subject 140 a first time after the light is emitted from the light source 110, and reflecting the light by the reflector 117 after the light has passed through the measurement subject 140 the first time. The light can pass through the measurement subject 140 a second time after the light has been reflected by the reflector 117. The receiver 120 can receive the light after the light has passed through the measurement subject 140 the second time, and the light that has passed through the measurement subject 140 the second time can define the property. The method can also include recording a second measurement of the property of the light received by the receiver 120, and comparing the first measurement to the second measurement.

In some embodiments, a method for analyzing the measurement subject 140 is also disclosed. The method can include providing the light source 110, the measurement subject 140, the reflector 117 and the receiver 120. Light can be emitted from the light source 110 towards the measurement subject 140, and the light emitted from the light source 110 can define a property. The light can pass through the measurement subject 140 a first time after the light is emitted from the light source 110, and the light can be reflected by the reflector 117 after the light has passed through the measurement subject 140 the first time. The method can also include passing the light through the measurement subject 140 a second time after the light has been reflected by the reflector 117. The light can be received by the receiver 120 after the light has passed through the measurement subject 140 the second time, and the light that has passed through the measurement subject 140 the second time can define the property. The method can further include recording a measurement of the property of the light received by the receiver 120 and comparing the measurement to reference data.

The measurement system 100 can detect an optical characteristic (or a change in the optical characteristic) of a measurement subject 140 by taking various measurements (such as the first and second measurements) at different times or by taking multiple first and/or second measurements. The characteristic, or change thereof, could be due to an amount or concentration of signal molecules bound to a substrate, such as a plate, tube, or microfluidic surface, or to molecular interactions with an antigen, antibody, or substrate. The characteristic, or change thereof, could also be due to molecular orientations of molecules in the measurement subject 140, and/or to exposure of the measurement subject 140 to a stimulus or condition such as thermal, optical, sonic, radiative, kinetic, or chemical exposure.

Examples of biochemical processes that could result in an optical change include hydrolysis, reduction, and oxidation. The characteristic, or change thereof, could also be due to a chemical reaction.

As described, light emitted from the light source 110 can define a property and a measurement can be recorded (or known data of the light source 110 and test conditions can be recorded) regarding the property of the light emitted from the light source 110. In some embodiments, the property is a wavelength of the light, which can be an average wavelength, a wavelength range, or a single wavelength. As described above, a measurement of the wavelength can be made after the light is emitted from the light source 110. Another measurement of the wavelength can be made after the light is received by the receiver 120 after travelling along the optical path 114, 115. The measurements can be compared and/or the second measurement can be compared to extant data or to reference data. In operation, various states, modifications, elements, characteristics or processes of the measurement subject 140 can alter a wavelength of the light that passes through the measurement subject 140 twice in the measurement system 100. In some embodiments, a biological or chemical process in the measurement subject 140 can cause an absorption of one, a range of, more than one, more than one range of, or an average wavelength of light passing through the measurement subject 140 twice. Thus, the wavelength-selective absorption caused by the measurement subject 140 can lead to a second measurement (of light received by the receiver 120) having a different saturation (or signal strength) of the one, range of, more than one, more than one range of, or average wavelength than the first measurement of light emitted from the light source 110 or than initial known properties of the light source 110 and test conditions.

In some embodiments, the property is an intensity of the light, which can be an average or total intensity over a period of time, or an instantaneous intensity. As described above, a measurement of the intensity can be made after the light is emitted from the light source 110 (or known data of the light source 110 and test conditions can be recorded). Another measurement of the intensity can be made after the light is received by the receiver 120. The measurements can be compared and/or the second measurement can be compared to extant data or to a reference data set. In operation, various states, modifications, elements, characteristics or processes of the measurement subject 140 can alter an intensity of the light that passes through the measurement subject 140 twice in the measurement system 100. In some embodiments, a biological process, such as bacterial growth, in the measurement subject 140 can increase the haze of the light passing through the measurement subject 140, in some cases by a factor of two or more. Such a haze can vary with bacterial growth in the measurement subject 140. The haze, caused by the turbid measurement subject 140, can scatter light passing through the measurement subject 140 and thus lead to a second measurement (of light received by the receiver 120) having a lower intensity than a first measurement of light emitted from the light source 110 or than initial known properties of the light source 110 and test conditions.

In some embodiments, the property is a polarization of the light. As described above, a measurement of the polarization can be made after the light is emitted from the light source 110 (or known data of the light source 110 and test conditions can be recorded). Another measurement of the polarization can be made after the light is received by the receiver 120. The measurements can be compared and/or the second measurement can be compared to extant data or to a reference data set. In operation, various states, modifications, elements, characteristics or processes of the measurement subject 140 can alter a polarization of the light that passes through the measurement subject 140 twice in the measurement system 100. In some embodiments, a biological or chemical process in the measurement subject 140 can alter a polarization state of the light passing through the measurement subject 140 twice, and a polarization state can be indicative of molecular binding, and can detect bound antibodies that may have fluorescent tags. Polarization state can also be used to detect chiral molecular materials, such as glucose. In non-limiting embodiments, polarization states can include circular polarization (and a right or left-handedness thereof), elliptical polarization (and a right or left-handedness thereof) and/or linear polarization (centered on a particular axis perpendicular to the propagation axis) or the the rotation of linear polarization about the propagation axis. The receiver 120, sensor 121 and/or pixel 124 can (with the aid of the polarizer 134) detect a polarization state of the light received by the receiver 120, sensor 121 and/or pixel 124. Such a result can be compared with a polarization state of light emitted from the light source 110, with reference data, or with initial known properties of the light source 110 and test conditions.

Accordingly, the measurement system 100 can emit light along one or more optical paths 114, 115, the light can pass through one or more portions of a measurement subject 140 at least partially contained in one or more vessels 150, 150a, 150b and each optical path 114, 115 can be reflected by the reflector 117, which can be a retroreflector. Each optical path 114, 115 can then travel once again through the measurement subject 140 portions and/or vessels 150, 150a, 150b, in the opposite direction as the original pass, before being received by the receiver 120, sensor 121 and/or pixel 124. A measurement of a property, which can be polarization, intensity and/or wavelength, among others, can be gathered by the receiver 120, sensor 121 and/or pixel 124 for one or more portions of the measurement subject 140 simultaneously, and the measurement can be compared to a measurement of light emitted from the light source 110 or to reference data.

Further, multiple first measurements can be taken at different times and multiple second measurements can be taken at different times, and any of the multiple first and/or second measurements taken at different times can be compared with one another and/or with reference data. In some embodiments, a measurement, which can be the second measurement, can be taken at a time, or over a time range, after the light source 110 is no longer emitting light. Additionally, in some embodiments, one or more portions of the measurement subject 140 can be subjected to a stimulus before and/or during a time, or times, when first and/or second measurements are taken. The stimuli can include, but are not limited to, thermal, chemical, mechanical, kinetic, radiative and optical stimuli.

Multiple measurements could be run in sequence. For example, the light source 110 could send light to the measurement subject 140, the emitted light having different emission spectra and/or polarization states at different times. The receiver 140 could then observe the response from each illumination event. Upon receiving a signal, the light source 110 can emit four different light emissions $I_1(\lambda, pol)$, $I_2(\lambda, pol)$, $I_3(\lambda, pol)$, $I_4(\lambda, pol)$, at times 1, 2, 3, 4 respectively, where I is the illumination at a given time having an emission spectrum $\lambda$ and a polarization state p. The receiver 120 could then make observations at different time periods as appropriate.

Thus, it can be seen that the present disclosure provides a measurement system 100 capable of gathering optical data of a measurement subject 140, or of individual portions of a measurement subject 140, faster, easier and cheaper than traditional measurement techniques. The present disclosure should not be considered limited to the particular examples and embodiments described above, as such embodiments are described in detail in order to facilitate explanation of various aspects of the disclosure. Rather, the present disclosure should be understood to cover all aspects of the disclosure, including various modifications, equivalent processes, and alternative devices falling within the scope of the disclosure as defined by the appended claims and their equivalents.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method for analyzing a measurement subject, the method comprising:
   providing a light source, the measurement subject, a reflector and a receiver, the reflector being a retroreflector;
   emitting light from the light source towards the measurement subject, the light emitted from the light source defining a property;
   recording a first measurement of the property of the light emitted from the light source;
   passing the light through the measurement subject a first time after the light is emitted from the light source;
   reflecting the light by the reflector after the light has passed through the measurement subject the first time;
   passing the light through the measurement subject a second time after the light has been reflected by the reflector;
   receiving the light by the receiver after the light has passed through the measurement subject the second time, the light that has passed through the measurement subject the second time defining the property;
   recording a second measurement of the property of the light received by the receiver; and
   comparing the first measurement to the second measurement,
   wherein light from the light source emitted along at least different first and second emitted directions passes through the measurement subject the first time in at least different first and second portions of the measurement subject disposed in respective spaced apart first and second vessels and is reflected from the retroreflector to the receiver along at least different respective first and second received directions after passing through the measurement subject the second time, the first and second received directions being substantially opposite directions from the respective first and second emitted directions.

2. The method of claim 1, wherein the property is polarization.

3. The method of claim 1, wherein the property is intensity.

4. The method of claim 1, wherein the property is wavelength or average wavelength.

5. The method of claim 1, wherein the reflector is disposed on an opposite side of the measurement subject than are the light source and the receiver.

6. The method of claim 1, wherein a polarizer is disposed proximate the receiver.

7. A method for analyzing a measurement subject, the method comprising:
   providing a light source, the measurement subject, a reflector and a receiver, the reflector being a retroreflector;
   emitting light from the light source towards the measurement subject, the light emitted from the light source defining a property;
   passing the light through the measurement subject a first time after the light is emitted from the light source;
   reflecting the light by the reflector after the light has passed through the measurement subject the first time;
   passing the light through the measurement subject a second time after the light has been reflected by the reflector;
   receiving the light by the receiver after the light has passed through the measurement subject the second time, the light that has passed through the measurement subject the second time defining the property;
   recording a measurement of the property of the light received by the receiver; and
   comparing the measurement to a reference data set,
   wherein light from the light source emitted along at least different first and second emitted directions passes through the measurement subject the first time in at least different first and second portions of the measurement subject disposed in respective spaced apart first and second vessels and is reflected from the retroreflector to the receiver along at least different respective first and second received directions after passing through the measurement subject the second time, the first and second received directions being substantially opposite directions from the respective first and second emitted directions.

8. The method of claim 7, wherein the measurement is taken at two or more different times.

9. The method of claim 7, wherein the measurement subject is subjected to a stimulus selected from the group consisting of thermal, chemical, kinetic, radiative and optical.

10. A measurement system, comprising:
   a light source;
   a receiver;
   a measurement subject comprising at least different first and second portions disposed in respective spaced apart first and second vessels; and
   a retroreflector, wherein the retroreflector is disposed on an opposite side of the measurement subject than are the light source and the receiver,
   wherein light from the light source emitted along different first and second emitted directions passes through the respective first and second portions of the measurement subject and is then reflected to the receiver along respective first and second received directions after passing back through the respective first and second portions of the measurement subject, the first and second received directions being substantially opposite directions from the respective first and second emitted directions.

11. The measurement system of claim 10, wherein each of the first and second vessels is a channel or a well.

12. The measurement system of claim 10, wherein a well plate comprises the first and second vessels.

13. The measurement system of claim 10, wherein each of the first and second vessels is a microfluidic feature.

14. The measurement system of claim 10, wherein a polarizer is disposed proximate the receiver.

15. The measurement system of claim 14, wherein the polarizer is selected from the group consisting of a linear polarizer, a circular polarizer and a polarizer array.

* * * * *